United States Patent Office 3,452,928
Patented July 1, 1969

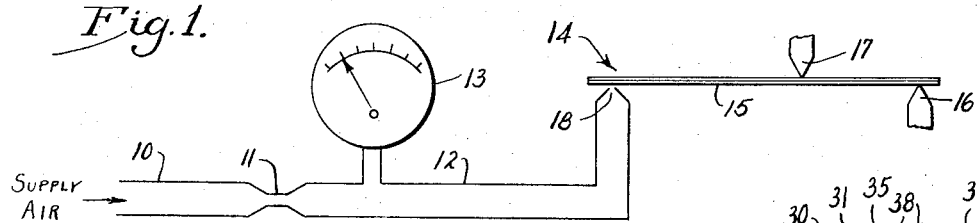
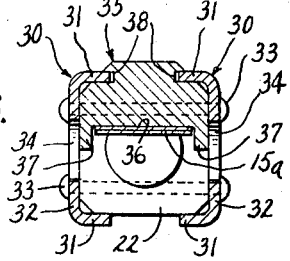

3,452,928
FLUID PRESSURE TRANSMITTER
Ernest H. Stark, Rockford, Ill., assignor to Barber-Colman Company, Rockford, Ill., a corporation of Illinois
Filed Aug. 16, 1967, Ser. No. 660,999
Int. Cl. G05d *16/00*
U.S. Cl. 236—44   15 Claims

ABSTRACT OF THE DISCLOSURE

A force-balance transmitter for varying the fluid pressure at a remote receiver as a function of a sensed condition employs a control force created by a bending moment responsive to the sensed condition and acting on an elongated resilient beam flapper in opposition to a feedback force applied to the flapper by the controlled fluid pressure acting over the area of the nozzle to vary said pressure.

Background of the invention

When automatic controls are used, it is frequently desirable to indicate the value of a sensed condition at a point remote from the sensing element. The instrument employed at the sensing element to provide a signal varying in response to the sensed condition is known as a transmitter. The varying signal is transmitted to a receiver which changes the signal received into a visual, audible or other indication of the value of the sensed condition. If pneumatic or hydraulic controls are employed, it is usual to change the pressure of the fluid in accordance with changes in the sensed condition and to indicate such changes on a pressure gage. The received signal may instead, or in addition, perform some control function.

Fluid pressure force balance transmitters are well known in the art and are characterized by balancing a force proportional to the controlled pressure of the fluid against a variable control force generated by the condition being measured, as distinguished from position sensitive transmitters in which the measured condition is converted into a variable, but relatively inflexible, position for a means controlling the fluid pressure. The force due to fluid pressure may constitute a negative feedback that tends to linearize the relationship of the fluid pressure to the variable measured condition. The force on a flapper caused by the fluid pressure acting over the area of the nozzle has been used to provide the required feedback. Such a device is disclosed in Zimmerli Patent 2,914,076.

As applied to automatic comfort controls employed in buildings, provision is often made for reading at a central control panel the temperatures and relative humidities prevailing in different zones. The temperature transmitters for this purpose may be mounted under the cover of a room thermostat, in a duct or light-troffer, so the dimensions, especially the cross-section, must be small. Humidity and set-point transmitters may be similarly located. Because of these space limitations, small overall size, especially in cross-section, is of prime importance. The market for such controls is extremely competitive, necessitating that such devices be low in cost. Low cost may be achieved by reducing the number and size of the parts required, by simplifying manufacture and assembly of the parts, by using the same parts in several similar devices, and by designing the devices to meet the requirements of many applications. Not only must the cost of the devices be low, but the cost of the entire system must be low, including installation, adjustment and inspection. The device must therefore be rugged, easily and quickly installed with a minimum of connections to other equipment, and readily adjustable, when necessary, without requiring special tools or extreme accuracy.

Summary

This invention covers fluid pressure transmitters primarily intended for use in comfort conditioning systems. They have a small cross-section, small overall size, and a single fluid connection to the receiver. The parts required employ a minimum of material and are easily assembled and adjusted. Many parts are common to a number of different transmitters. These features are combined to make the transmitters applicable to many types of installations at a low cost.

Brief description of the drawings

FIG. 1 is a schematic diagram of a typical transmitter-receiver system incorporating a temperature transmitter according to this invention.

FIG. 2 is a sectional view of a pneumatic temperature transmitter according to this invention.

FIG. 3 is a sectional view taken along line 3—3 of FIG. 2.

FIG. 4 is a sectional view of a pneumatic humidity transmitter.

FIG. 5 is a sectional view taken generally along line 5—5 of FIG. 4.

FIG. 6 is a sectional view of a pneumatic set-point transmitter.

Description of the preferred embodiments

FIG. 1 shows a pneumatic transmitter-receiver system comprising a source of supply air delivered at constant pressure (ordinarily about 18 p.s.i.) by main 10, through a restriction 11 limiting the air flow, to branch 12 connecting the receiver 13 (shown as a pressure gage) and the transmitter 14. The transmitter comprises essentially a thermostatic bimetal flapper 15, freely supported upon pivot 16 and restrained by abutment 17 to move toward or away from nozzle 18 as the temperature fluctuates. When the nozzle 18 is completely closed by flapper 15, flow through the nozzle ceases and the branch pressure rises to supply pressure. When nozzle 18 is entirely open, the branch pressure, as indicated by receiver 13 falls to approximately 0 p.s.i. In practice the branch pressure is modulated between 15 and 3 p.s.i. as the temperature varies within the proportional band. Let us assume that the branch pressure is to rise with increasing temperature. The bimetal flapper 15 is then mounted with the high expansion side up so that it tends to bow with the concave side down as the temperature rises and to close the nozzle 18, thus decreasing the flow of air through the nozzle and raising the branch pressure indicated by the receiver 13. The receiver may be calibrated to indicate the temperature directly, or to indicate the difference between the measured temperature and a set-point. A control force exerted by the flapper results from bending moments set up in the flapper, as by the unequal stresses in the high and low expansion metals comprising a bimetal. The branch pressure acting upon the flapper 15 over the area of nozzle 18 results in a force acting upon the flapper in opposition to the control force. When these two forces are in equilibrium, the flapper is stationary and the branch pressure is constant at a value corresponding to the sensed temperature causing the bending moments. When a bimetal is unrestrained, a change in temperature manifests itself as movement (bowing of the strip) and, when it is completely restrained, the change manifests itself in the force exerted by the bimetal upon its restraints. By means of partial restraint any combination of movement and force may be obtained. When the nozzle area is small, the force exerted by branch pressure on the flapper is also small, so that the control force created by a temperature change is much larger in its affect upon the flapper and the transmitter is substantially position sensitive. When the nozzle is large in area, the resulting force exerted by the branch pressure upon the flapper is also large, so that bending of the bimetal flapper is restrained and a substantially force-balanced transmitter results.

FIGS. 2 and 3 show a preferred embodiment of a pneumatic force-balance temperature transmitter in accordance with this invention. In it, a fitting 19 is provided at one end of the transmitter 14a to serve as an inlet for a restricted supply of air under pressure from the branch 12 to a passageway 20 for transmission lengthwise of the transmitter through a treaded mounting bushing 21 and an attachment portion 22 to the sharp-edged nozzle 18, directed perpendicular to the passageway. Around the nozzle is a counterbore 23 acting as a cage for a small, light ball 24 positioned between the nozzle 18 and the resilient thermostatic bimetal flapper 15a to assure closure of the nozzle when desired regardless of any mismatch between the planes of the nozzle and flapper. The flapper 15a has at one end a countersunk hole 25 fitting loosely over a post 26 and against a sloping shouldler 27, both being concentric portions of a screw 28 permitting the flapper to pivot freely thereon. The screw 28 is threaded into a support 29, held in fixed relation to the attachment portion 22 by a pair of identical opposed channels 30. The support 29 and attachment portion 22 are embraced by the flanges 31 of each channel and are secured between the webs 32 thereof as by rivets 33. The flanges of the opposed channels 30 are spaced from each other to permit air to circulate over the bimetal flapper 15a, to serve as guides, as hereafter explained, and to permit access to the pivot screw 28. The webs 72 may be apertured as at 34 to increase the air circulation without appreciably reducing the rigidity of the transmitter or the protection afforded the operating mechanism. An a butment 35 contacts the flapper 15a at points along a straight line such as a knife edge 36 between side walls 37, narrowly limiting lateral motion of the flapper with respect to the abutment. A pair of oppositely facing grooves 38 on the abutment 35 closely engage a pair of opposed flanges 31 which serve as guides establishing a path for movement of the abutment along the length of the flapper 15a The side walls 37 on the guided abutment 35 and the pivot post 26 prevent misalignment of the flapper 15a, while the line contact with knife edge 36 and the pivot shoulder 27 establish a plane for it. The abutment 35 engages the flapper 15a on the opposite side from and intermediate the ball 24 and shoulder 27, tending to bow the flapper out of the line established by contact with the ball 24 and shoulder 27 and set up a biasing bending moment. The bimetal for the flapper 15a was selected to be just thick enough to withstand the stresses to be normally expected in such an application without permanent deformation, resulting in the relatively flexible flapper required in a force-balance system.

When the transmitter 14a is connected by its fitting 19 to branch 12 to receive a restricted flow of air under pressure, the pressure acts over the area of the nozzle 18 to provide a force tending to lift the ball 24 and so open the nozzle, allowing air to escape therethrough and, in well known manner, reduce the air pressure in the branch 12. This tendency for branch air pressure to move the ball away from the nozzle is opposed by a control force exerted upon the ball by the flapper 15a. This control force results from the biasing bending moment increased or decreased by the bending moment created in the bimetal of the flapper by the ambient air temperature. The motion required of the ball 24 to change the branch pressure from minimum to maximum (3 to 15 p.s.i.) is very small, being on the order of .0005 inch, so that the motion required of the flapper 15a is negligible and the transmitter may be considered to be almost 100% force-balanced in its operation. When the system is in equilibrium, the opposing forces on the ball 24 balance each other and the branch pressure is constant. When the ambient temperature rises, the bending moment generated in the bimetal increases, and, if the high expansion side of the bimetal flapper 15a is adjacent the abutment 35, the resulting flapper force will move the ball 24 toward the nozzle 18, reducing the air flow therethrough, and so increasing the branch pressure until another equilibrium condition is established. When the ambient temperature falls, the bending moment in the bimetal decreases, resulting in a lower control force and permitting the force due to the pressure to move the ball 24 away from the nozzle 18, increasing the air flow therethrough, and so reducing the branch pressure until a new equilibrium condition is established. The bending moment generated in bimetal is substantailly proportional to the temperature within the temperature range in which it is intended to operate, so the change in control force is substantially proportional the change in temperature as long as the support points remain fixed. Since the effective area of the nozzle 18 is substantially constant within the small range of movement of the ball 24, the force due to branch pressure is substantially proportional to the change in pressure. Since the opposing forces must be equal when the system is in equilibrium, it is obvious that any change in ambient temperature will result in a substantially proportional change in branch pressure. If the low expansion side of the bimetal is adjacent the abutment 35, the bending moments generated in the flapper 15a will be reversed, causing the branch pressure to change in substantially inverse proportion to any change in ambient temperature.

It will be apparent from beam theory that moving the abutment 35 along flapper 15a will result in a different distribution of forces exerted by the flapper. As the abutment 35 is moved toward the ball 24, the force exerted by the flapper 15a upon the ball is increased and the change in force resulting from a given temperature change will be greater. The change in temperature required to shift the branch pressure by a specified amount is therefore less and the proportional band, which is the change in measured condition require to shift the branch pressure between minimum and maximum values, is reduced. As the abutment 35 is moved away from ball 24, the proportional band is similarly increased. Such an adjustment may be employed to change the proportional band to suit requirements after installation, but ordinarily it is employed only as a factory adjustment to compensate for various manufacturing tolerances, after which the abutment 35 is cemented to the flanges 31 to prevent unauthorized movement. It is also apparent from beam theory that, as the shoulder 27 of the pivot is moved up and down as by screw 28, the biasing bending moment in flapper 15a is respectively increased and described, so that correspondingly less and more bending moment due to temperature is required to produce a given control force on the ball 24. The screw 28 therefore serves as a set point adjustment after installation as well as an adjustment in the factory to compensate for manufacturing tolerances. It may be cemented to the support 29 to prevent tampering, if desired.

One feature of this construction is that, with the exception of pivot screw 28, all of the parts may be laid in place and then permanently retained in position by fasteners 33. While four rivets are shown, only two fasteners (one at each end) are necessary for this construction. Not only does this simplify construction, but the flapper is free of mounting stresses, such as occur when it is mounted as a cantilever, and, as an added bonus, this simple beam construction requires only one quarter of the bimetal needed for a cantilevered flapper.

FIGS. 4 and 5 show a humidity transmitter 14b identical to the temperature transmitter of FIGS. 2 and 3 except for the flapper and its associated humidity sensor. An optional housing is also shown. Since the construction and operation are substantially identical to the temperature transmitter, only the differences will be here described. The spring flapper 15b is identical to bimetal flapper 15a except for material and thickness. It is made of heat treated beryllium-copper instead of thermostatic bimetal. Any difference in thickness due to different material properties and structural requirements is small, so that the system is still force balanced. A pair of brackets 39, rigidly fastened to the respective ends of the spring flapper 15b are formed to provide oppositely facing retainers 40 for respective bars 41 holding in tension between them a humidity sensitive element in the form of a closed loop 42 of nylon film. The brackets 39 are narrow as compared with the loop 42 so as not to interfere with even distribution of stress in the nylon. Holes 43 centrally located on the loop 42 where it passes around the bars 41 provide clearance for the brackets 39. Nylon has the property of expanding with humidity so that, as the surrounding atmosphere becomes more humid, the bending moment applied by the nylon loop 42, through brackets 39, to the spring flapper 15b decreases and the flapper applies more force to the ball 24, moving the ball toward closure of the nozzle 18 to increase the branch pressure. If the atmosphere becomes less humid, the nylon contracts, increasing the bending moment on the flapper, and reducing the branch pressure.

It is desirable to isolate the nylon loop 42 from the air escaping from the nozzle 18 to assure that only the ambient humidity is being measured. It is also desirable to provide mechanical protection for the sensing element. The optional housing shown provides both of these functions. It is made up of two identical halves 44 divided longitudinally into two substantially isolated chambers 45 and 46, with the former containing the sensing loop 42 and the latter containing essentially the pneumatic portion of the transmitter 14b. The chambers 45 and 46 are separated from each other by a partition 47, solid with the exception of two holes 48 providing enough clearance around brackets 39 to permit movement of the latter without interference, but small enough to allow only a very small air movement between the chambers. A series of windows 49 extending through the top 50 and side 51 of chamber 45 provide almost unlimited circulation of ambient atmosphere over and around the sensing loop 42, while substantially protecting the loop from damage. The side 52 of chamber 46 is solid to direct air bled from the branch line away from windows 49. The bottom 53 has a series of large vents 54 therein encouraging the air bled from the branch line to escape therethrough to atmosphere in a direction away from windows 49 or holes 48. The partition 47, side wall 52 and bottom 53 are spaced from the channel 30 to permit substantially unrestricted flow of the bled air to the vents. Therefore, very little air bled from the branch line finds access to chamber 45 and sensor 42. Transmitter 14b is mounted in the housings 44 between pairs of ribs 55, fitting closely against the channels 30. A projection 56 from each rib 55 fits snuggly into one of the apertures 34 to prevent longitudinal and vertical movement of the transmitter in the housing 44. It will be seen that the abutment 35 is entirely enclosed within the housing, making it relatively immune to tampering, while screw 28 is readily accessible for adjustment through one of the vents 54. An opening 57 fits closely around the mounting bushing 21 at one end of the housing, permitting the connection of fitting 19 to branch line 12 external to the housing. Little bled air escapes through the openings 57 because the channels 30, attachment portion 22 and support 29 are close to the openings to hinder such escape. The two halves 44 of the housing are held together as by rivets 58. It has been found that a housing of this type greatly improves the correlation of the signal being transmitted to the humidity of the ambient air.

FIG. 6 shows a set point transmitter 14c very similar in construction to temperature transmitter 14a, shown in FIGS. 2 and 3. Again only the differences will be described. A spring 59 is held in place by an upturned end 60 retained in a groove 61 between the attachment portion 22 and the nozzle 18 to prevent longitudinal motion and provide a fixed support for the spring 59. A small bend 62 in spring 59 supplies a second fixed spring support in contact with flanges 31 and creates a spring-biased cantilever 63, supporting screw 28 in a threaded bushing 64 affixed to the cantilever. A follower 65 at the free end of cantilever 63 is pressed by the spring bias against a cam 66, whereby the position of the pivot screw 28 may be raised or lowered as a result of rotation of the cam. The cam 66 is rigidly fastened for rotation to a shaft 67 journaled in a block 68 used in place of support 29. A spring flapper 15c, similar to 15b, is mounted between ball 24, pivot screw 28 and abutment 35. Calibration is accomplished by means of the screw 28 and abutment 35 as in temperature transmitter 14a.

The set point to be transmitted is introduced by manually or automatically rotating the shaft 67 to agree with the set point adjustment of the controlling thermostat, humidistat, or other condition controlling device. The resulting rotation of the cam 66 raises or lowers the follower 65, causing the pivot screw 28 to be similarly moved. This increases or decreases the bending moment in flapper 15c, creating a correspondingly higher or lower control force upon the ball 24, moving the latter toward or away from the nozzle 18, diminishing or augmenting air flow therethrough and so raising or lowering the branch pressure measured by the receiver 13.

It will be obvious to those skilled in the art that many modifications are possible. Other fluids than air could be controlled. There are humidity sensitive laminated composite materials that could be substituted for the bimetal 15a to convert the temperature transmitter 14a in FIGS. 2 and 3 into a humidity transmitter. Hair, wood, paper, and other humidity sensitive materials could be substituted for the nylon loop 42 of the humidity transmitter 14b in FIGS. 4 and 5, or temperature sensitive materials could be substituted for the nylon to convert the humidity transmitter into a temperature transmitter. The set point transmitter 14c can be employed as a position indicator by rotating shaft 67 in response to liquid level, valve stem position or any other physically movable material. Many structural equivalents are also obvious. The scope of this invention is limited only by the claims.

I claim:

1. A force-balance fluid pressure transmitter comprising, a nozzle having a discharge area, an inlet for conducting a restricted supply of fluid under pressure to said nozzle, a resilient simple beam flapper, a pivot permitting free movement of said flapper toward and away from the nozzle, a rigid abutment between the nozzle and said pivot to bias the flapper toward said nozzle, and means for applying to said flapper a bending moment responsive to a sensed condition, said bending moment providing a control force variably opposing flow of the fluid through said nozzle and thereby modulating the pressure of said fluid, the modulated fluid pressure acting over the area of the nozzle to provide to the flapper a negative feedback force proportional to said fluid pressure whereby a balance of opposing forces over the nozzle determines the position of the flapper.

2. An elongated force-balance pneumatic fluid pressure transmitter having a small transverse cross-section and comprising:
    a fitting at one end of and aligned with the longitudinal axis of said transmitter for connection to a restricted supply of fluid under pressure,
    a nozzle joined to said fitting and directed perpendicular to the longitudinal axis,
    a passageway for conducting the fluid through the fitting to said nozzle,
    a pivot adjacent the other end of said transmitter,
    a means for positioning said pivot with respect to the nozzle,
    a normally unstressed elongated resilient simple beam flapper freely supported at a first end upon said pivot for movement of a second end in alignment with the nozzle, a rigid abutment between the nozzle and the pivot biasing said flapper toward the nozzle, and means for applying to said flapper a bending moment responsive to a sensed condition to set up a control force variably opposing flow of the fluid through said nozzle and to thereby modulate the pressure of said fluid, said fluid pressure acting over the area of the nozzle to provide a negative feedback proportional to said fluid pressure.

3. In a pressure transmitter according to claim 2, a ball between the flapper and said nozzle and movable by said flapper toward closure of the nozzle in opposition to said fluid pressure.

4. In a pressure transmitter as in claim 2, said pivot adjustable perpendicular to the plane of said flapper to change the set point.

5. In a pressure transmitter according to claim 2, said abutment movable lengthwise of the flapper to change the proportional band.

6. In a pressure transmitter according to claim 2, said flapper comprising laminated composite material, the bending moment being supplied in response to differential expansion and contraction of said laminates with changes in the sensed condition.

7. In a pressure transmitter according to claim 2, said flapper comprising thermostatic bimetal, and the bending moment being provided by heating and cooling said bimetal.

8. In a pressure transmitter according to claim 2, brackets fixed upon and extending perpendicularly from said respective first and second ends of the flapper, and a sensitive element mounted between the free ends of said brackets to provide the bending moment to said flapper.

9. In a pressure transmitter according to claim 2, brackets extending perpendicularly from said respective first and second ends of the flapper, and a humidity sensitive element taut between the free ends of said brackets to provide the bending moment to said flapper.

10. In a pressure transmitter according to claim 8, a partition substantially isolating said condition sensitive element from the fluid discharged through the nozzle, while permitting ambient air to circulate over and around said element.

11. In a pressure transmitter according to claim 8, a housing enclosing the transmitter, a partition in said housing isolating said condition sensitive element from the fluid discharged through the nozzle, and means permitting circulation of ambient air over and around said element.

12. In a pressure transmitter according to claim 2, said pivot mounted upon a movable support, means for biasing said support to provide the bending moment to the flapper, and an adjustment means for moving said support in opposition to the biasing means to control the bending moment.

13. In a pressure transmitter according to claim 12, said adjustable means comprising a cam mounted fixedly upon a rotatable shaft extending longitudinally from the other end of said transmitter.

14. In a pressure transmitter according to claim 2, said pivot and said abutment together determining a plane from which the flapper is deflected by said bending moment and the fluid pressure over the nozzle.

15. In a pressure transmitter according to claim 2, the fitting and said nozzle combined in a single part, said positioning means comprising a support for the pivot and a rigid member interconnecting the support and said part, said abutment mounted upon said member, a first fastener joining said member to the part, and a second fastener joining said member to the support whereby the entire transmitter is held together by said fasteners.

References Cited

UNITED STATES PATENTS

| | | | |
|---|---|---|---|
| 1,151,814 | 8/1915 | Norwood | 236—44 X |
| 1,162,170 | 11/1915 | Johnson | 236—44 X |
| 1,858,725 | 5/1932 | Armstrong | 236—44 |
| 3,368,755 | 2/1968 | Smith | 236—44 |

WILLIAM J. WYE, *Primary Examiner.*

U.S. Cl. X.R.

236—87